United States Patent
Jesadanont et al.

(10) Patent No.: US 6,892,665 B2
(45) Date of Patent: May 17, 2005

(54) SMART FLYING OUTBOARD BOAT

(76) Inventors: Mongkol Jesadanont, 386/2
Ratchadaphisek 42, Ratchadaphisek Rd.,
Chatuchak, Bangkok 10900 (TH);
Apijade Jesadanont, 386/2
Ratchadaphisek 42, Ratchadaphisek Rd.,
Chatuchak, Bangkok 10900 (TH);
Sukanya N. Jesadanont, 386/2
Radchadaphisek 42, Ratchadaphisek
Rd., Chatuchak, Bangkok 10900 (TH)

( * ) Notice: Subject to any disclaimer, the term of this patent is extended or adjusted under 35 U.S.C. 154(b) by 38 days.

(21) Appl. No.: 10/270,435

(22) Filed: Oct. 15, 2002

(65) Prior Publication Data

US 2004/0069201 A1 Apr. 15, 2004

(51) Int. Cl.[7] .................................. B63B 1/16
(52) U.S. Cl. ..................................... 114/272
(58) Field of Search ................. 114/271–273

(56) References Cited

U.S. PATENT DOCUMENTS

| | | | |
|---|---|---|---|
| 1,823,735 A | * 9/1931 | Glasby | 244/63 |
| 3,207,120 A | * 9/1965 | Verdi | 114/273 |
| 3,522,785 A | * 8/1970 | Thompson | 114/273 |
| 6,398,600 B1 | 6/2002 | Lawson | |
| 6,439,148 B1 | 8/2002 | Lang | |

* cited by examiner

Primary Examiner—Jesus D. Sotalo
(74) Attorney, Agent, or Firm—S. Jesadanont

(57) ABSTRACT

A flying outboard boat which can fly over the water having only its propeller rotates in the water comprises a hull with wings project on both sides. Underneath the wings there installed flaps one couple at anterior part and another couple at posterior part of said boat to help lifting and tilting of said boat by moving the flaps pivotally up or down. The engine of the boat can move vertically through moving a frame the engine mounted to by a motor where the propeller installed to the lowest end of a stem of the engine. Navigation control systems comprises a steering wheel, an accelerating pedal, switches to move the engine up and down by a motor, switches to move flaps and lastly, electrical and electronics circuits to control switches and motors.

1 Claim, 6 Drawing Sheets

SMART FLYING OUTBOARD BOAT

BACKGROUND OF THE INVENTION

The presently available outboard boat is now very practical and with high efficiency due to the successful development of outboard engine with high performance having light weight and much greater horse-power. The boat can be driven at very high speed and in addition, the boat body is now made of fiber glass or synthetic materials which makes the boat strong and durable, with lighter weight and can withstand a much greater impact than in the past. Nevertheless, the position of the engine and the propeller used in the conventional outboard boat remains stationary at all time during operation. Thus, when the boat moves at a very high speed the front part of the boat is lifted up high while the rear part remains in the water, as shown in FIG. 6. When the speed is even higher at a certain velocity, the whole boat body including the propeller is lifted above the water surface. The propeller blades then rotate freely in the air and give not enough force to drive the boat forward, this makes the boat fall suddenly down and bump against the water surface. These occur alternately all the time during driving a boat at a very high speed which makes it very uncomfortable to the people sitting in the boat in addition that it can be quite harmful to their visceral organs and causes chest pain.

The present invention describes a design and a method to have the whole body of a boat lifted over the water yet the propeller of its engine remains at all time under the water which drives the boat forward at a very high speed since the friction is minimized and there is no bumping down of the boat body. This saves a lot of energy and makes the boat occupants feel quite comfortable all the time due to the smooth moving of the boat.

SUMMARY OF THE INVENTION

A flying outboard boat which can fly over the water while its propeller remains rotating under the water thus minimizing the water friction to save significantly the energy required to move the vehicle. The main components comprises a hull, an engine having a propeller mounted thereto at the lowest end of its stem which is movable vertically up and down to keep the propeller blades rotate under the water at all time to drive the boat forward and means comprises wings and controllable flaps to help aerodynamically uplift and tilting of the boat body.

DETAILED DESCRIPTION OF THE PREFERRED EMBODIMENTS

Figure 1:
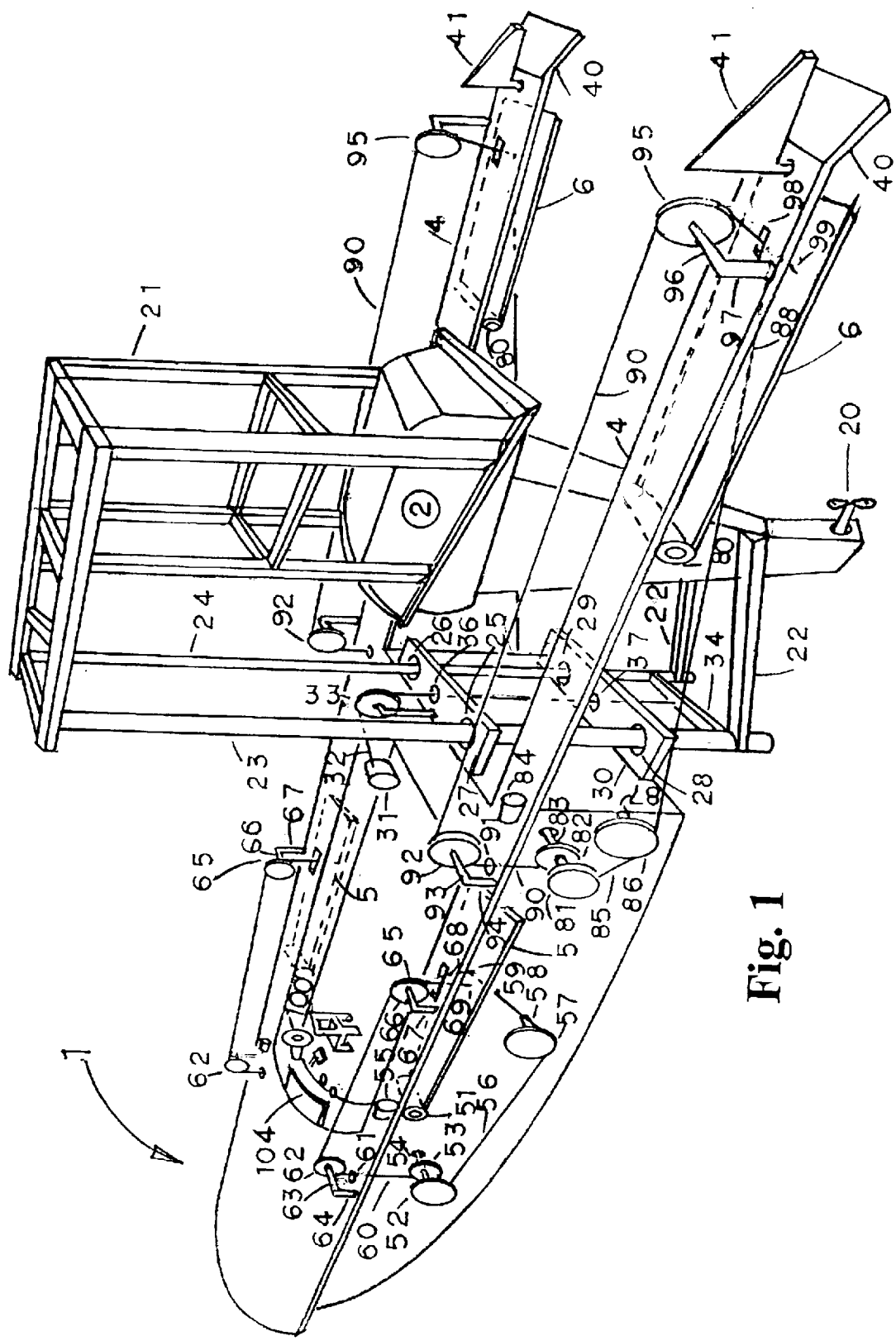
FIG. 1 is a perspective view showing all the components of an outboard boat in this invention in details.
Figure 2:
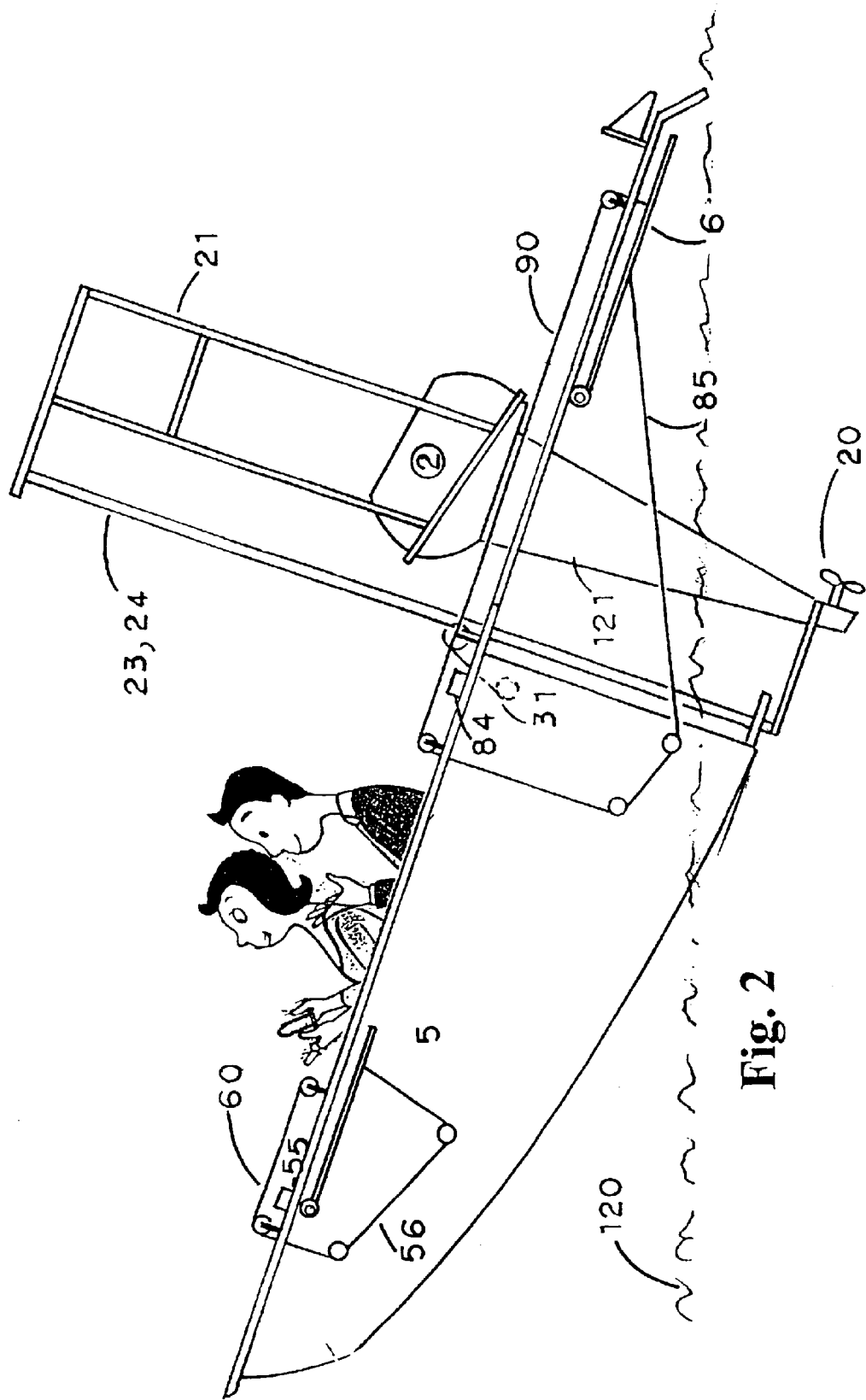
FIG. 2 is a side view of the outboard boat as in FIG. 1.
Figure 6:
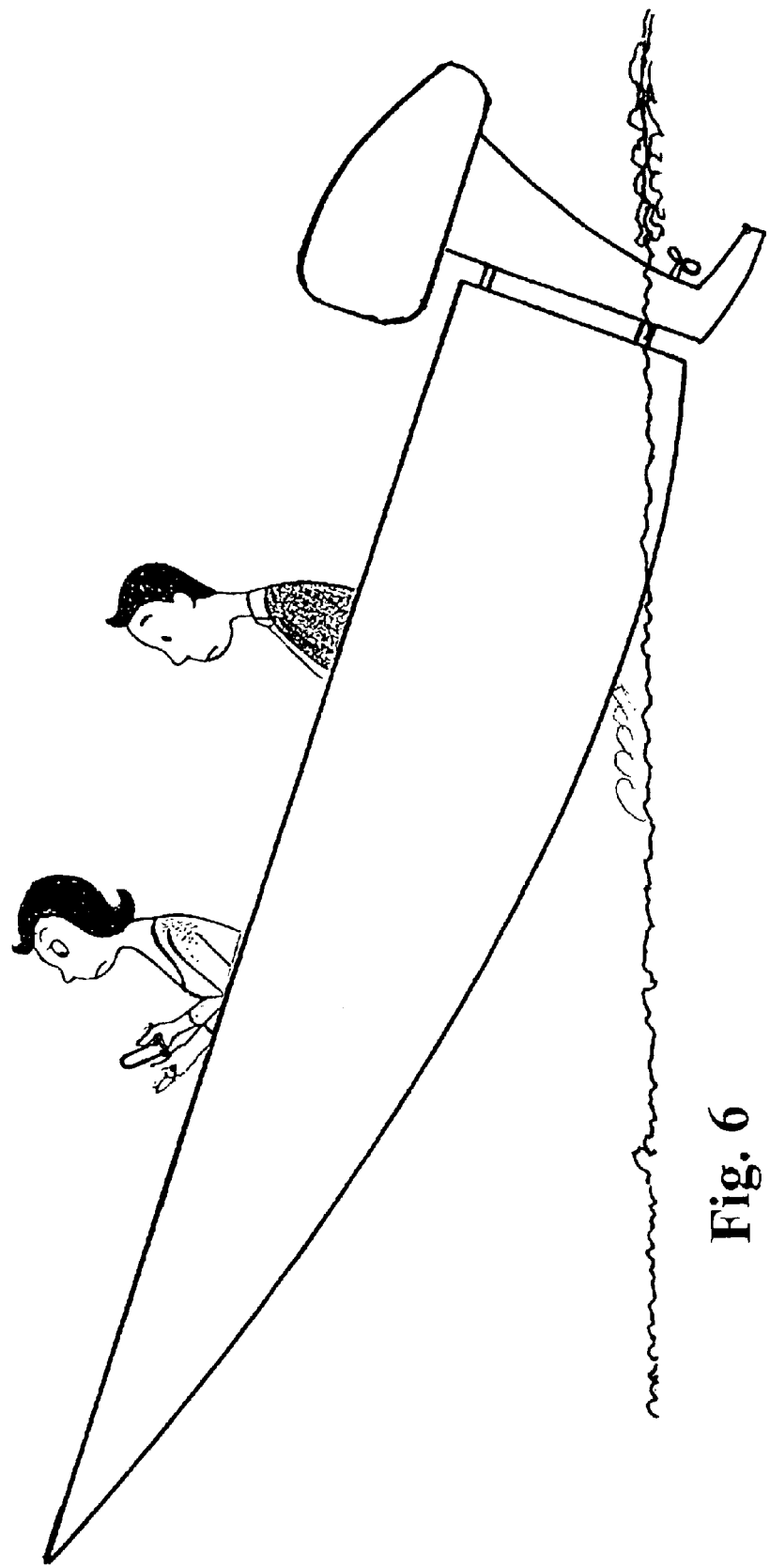
FIG. 6 is the conventional outboard boat presently available.

Boat 1 is a flying outboard boat in the present invention. As shown in FIGS. 1 and 2, the boat is driven at a velocity high enough to lift up the front part of the boat body while the rear part remains at the water surface. At this position, its engine is at the level that the blades of the propeller rotate in the water which gives a force great enough to drive the boat forward similar to that of conventional boat shown in FIG. 6.

Boat 1 comprises main components as follows:
1. Out board Engine 2, which is an engine conventionally used in driving a boat, however, in the present invention it is installed by mounting to a movable frame 21 and iron bars 22 such that the level of the engine can be adjusted up and down vertically to a level above the water surface as desired;
2. Wings 4 which projects from both sides of the hull of boat 1;
3. Flaps 5 mounted underneath each wing located to the anterior part of boat 1;
4. Flaps 6 mounted underneath each wing located to the posterior part of boat 1 posterior to engine 2; and
5. Navigation Control Systems The function of each component is described in details as follows:

1. Outboard Engine 2 is a conventional engine (FIG. 1) having light weight and with high horse power presently available. It is installed outside at the back of boat 1 with a propeller 20 at the lowest portion of a stem extending out from engine 2. The blades of propeller rotate to drive the boat forward where during sailing of the boat forward the propeller must be underneath the water surface at all time. Engine 2 is mounted to frame 21 and bars 22 made of iron at the upper and the lower parts of engine 2, respectively. Frame 21 and bars 22 are welded to two vertical iron shafts 23 and 24 positioned about 3 feet apart. As shown in FIG. 1, iron shaft 23 passes through two circular spaces 25 and 28 in iron plates 27 and 30, while iron shaft 24 passes through two circular spaces 26 and 29 in iron plates 27 and 30, respectively, to have the lower end of each shaft 23 and 24 welded to an iron bar 34 at the lowest level under iron plate 30. Iron plates 27 and 30 are welded to the back of boat 1 at the upper and the lower level, respectively.

In each circular space 25, 26, 28 and 29, there mounted a ball bearing cartridge to facilitate moving of iron shafts 23 and 24 up and down vertically and freely.

Moving of engine 2 up and down vertically can be controlled by a DC motor 31 which pulls a cable 32 through a pulley 33 fixed onto iron plate 27. Cable 32 passes through circular spaces 36 and 37 in iron plates 27 and 30, respectively, to have its lowest end welded to iron bar 34.

When motor 31 pulls cable 32 up, pulley 33 rotates counterclockwise and engine 2 is pulled upward and when motor 31 releases cable 32 down, pulley 33 then rotates clockwise thus allows engine 2 move vertically downward.

2. Wing 4 projects from each side of the boat body, where at the posterior end of each wing extends further passing engine 2 with its end slightly bends down as shown in FIG. 1 to help increasing the uplift aerodynamically. At the end of each wing 4, there is an air rudder installed on top to help steering the boat.

3. Flap 5 is installed underneath each wing 4 positioned relatively to the front of the boat. Flap 5 can pivotally move about a hinge 51 fixed to wing 4.

Pulleys 52 and 53 are installed on the boat body at a position lower and anterior to wing 4, where both pulleys have identical diameter and rotate about the same shaft 54 of motor 55 installed at the front of boat 1.

Motor 55 drives pulleys 52 and 53 clockwise or counterclockwise through shaft 54. Cable 56 has its proximal end fixed to pulley 52 at the pulley groove and its distal end fixed to position 59 underneath at the posterior end of flap 5. Cable 56 moves in a manner that when pulley 52 rotates clockwise, cable 56 winds about the axis of pulley 52 and passes through the groove of a pulley 57 causing pulley 57 to rotate freely about shaft 58 which is fixed to the boat body lower to flap 5.

Cable 60 has its proximal end fixed to pulley 53 at the pulley groove where it passes through circular space 61 of wing 4 and passes over a groove of pulley 62 which rotates freely about shaft 63 connected to stem 64 to hold pulley 62 up above the surface of wing 4. Cable 60 passes further over a groove of pulley 65 which rotates freely about shaft 66 connected to stem 67 to hold pulley 65 up above the surface of wing 4. The distal end of cable 60 then passes down through a rectangular space 68 to have its end fixed to position 69 at the dorsal surface of posterior end of flap 5.

4. Flap 6 is installed underneath each wing 4 positioned relatively to the back of boat 1. Flap 6 can pivotally move about a hinge 80 fixed to wing 4.

Pulleys 81 and 82 are installed at a position on the boat body lower and posterior to flap 5, where both pulleys have identical diameter and rotate about the same shaft 83 of motor 84 installed close to the back of boat 1.

Motor 84 drives pulleys 81 and 82 clockwise or counterclockwise through shaft 83. Cable 85 has its proximal end fixed to pulley 81 at the pulley groove and its distal end fixed to position 88 underneath at the posterior end of flap 6. Cable 85 moves in a manner that when pulley 81 rotates clockwise, cable 85 winds about the axis of pulley 81 and passes through the groove of a pulley 86 causing pulley 86 to rotate freely about shaft 87 which is fixed to the boat body lower to flap 6.

Cable 90 has its proximal end fixed to pulley 82 at the pulley groove where it passes through circular space 91 of wing 4 and passes over a groove of pulley 92 which rotates freely about shaft 93 connected to stem 94 to hold pulley 62 up above the surface of wing 4. Cable 90 passes further over a groove of pulley 95 which rotates freely about shaft 96 connected to stem 97 to hold pulley 65 up above the surface of wing 4. The distal end of cable 90 then passes down through a rectangular space 98 to have its end fixed to position 99 at the dorsal surface of posterior end of flap 6.

Figure 5:
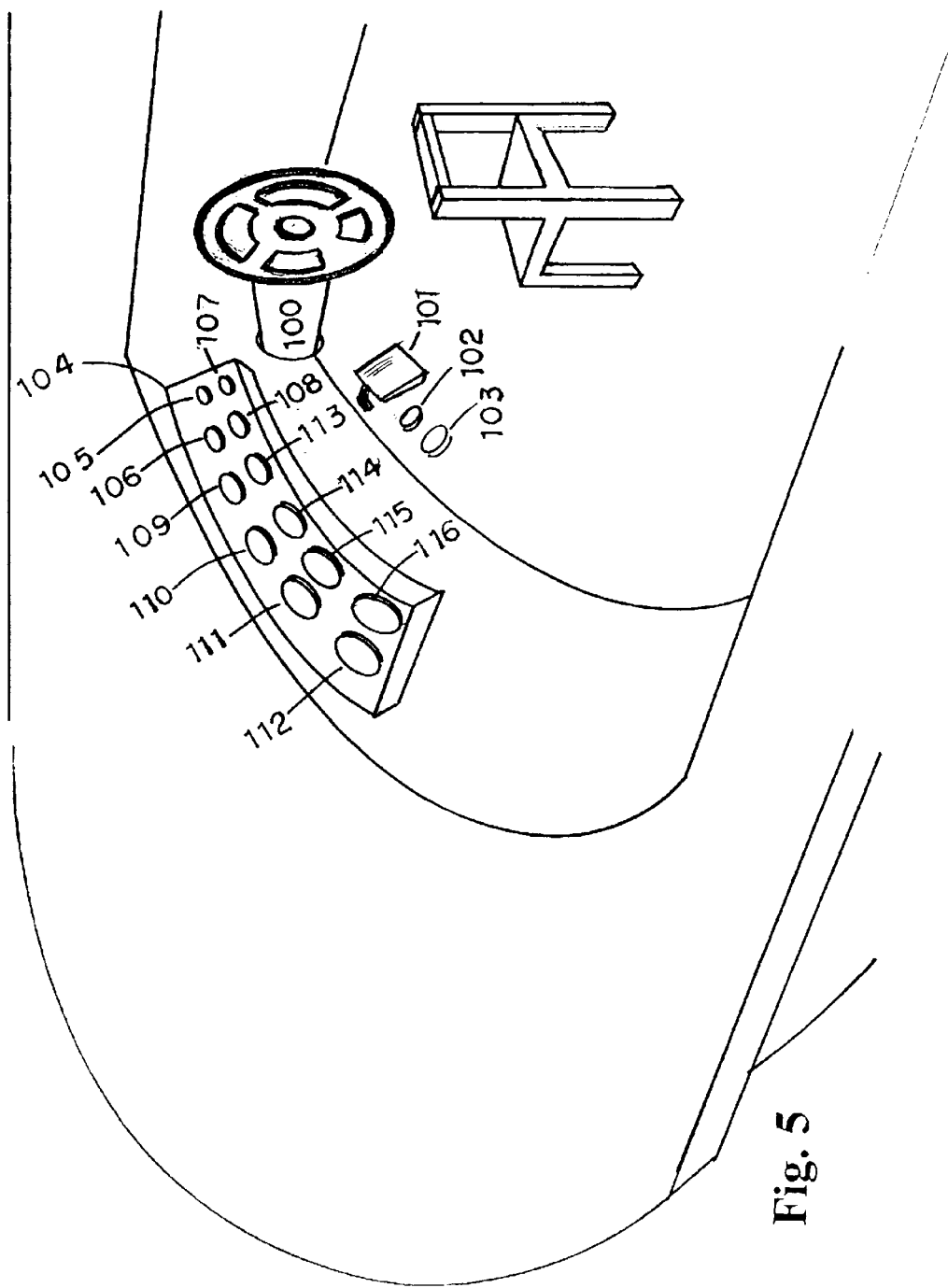
FIG. 5 shows an enlarge view of the navigation control systems.

5. Navigation Control Systems (FIG. 5) comprises:
   5.1 Steering wheel 100: for controlling the air rudders 44 that the boat will turn right or left where navigator can control only by one hand; or by both hands when the boat has already fly above the water surface;
   5.2 Accelerating Pedal 101: to be pressed or released that engine 2 is accelerated or decelerated;
   5.3 Switch 102 : to be pressed by left foot that motor 31 lowers the level of engine 2;
   5.4 Switch 103: to be pressed by left foot that motor 31 moves the level of engine 2 up;
   Accelerating Pedal 101, Switch 102 and Switch 103 are installed on the floor just in front of a seat for driver
   5.5 Instrument Panel 104 comprises switches to control motors to pivotally move flaps 5 and 6 by the driver's fingers.

Press Switch 105 to move flap 5 both left and right pivotally downward,
Press Switch 106 to move flap 5 both left and right pivotally upward,
Press Switch 107 to move flap 6, both left and right pivotally downward,
Press Switch 108 to move flap 6, both left and right pivotally upward,
Press Switch 109 to move flap 5 only the right one pivotally downward,
Press Switch 110 to move flap 5 only the right one pivotally upward,
Press Switch 111 to move flap 5 only the left one pivotally downward,
Press Switch 112 to move flap 5 only the left one pivotally upward,
Press Switch 113 to move flap 6 only the right one pivotally downward,
Press Switch 114 to move flap 6 only the right one pivotally upward,
Press Switch 115 to move flap 6 only the left one pivotally downward, and
Press Switch 116 to move flap 6 only the left one pivotally upward;

where design of electrical circuits is necessary to control all the parts controlled by switches 102–116, such that if pressing is continuous, the motor it controls will also function continuously. Upon releasing the foot or the finger from the switch, the motor will stop functioning right away and allows engine 2 or flaps to remain stationary locked at that position. Only when any switch is pressed again, then the part it controls will function further.

To control flap 5 or 6 that it moves upward or downward, one can do as follows:

As in FIGS. 1 and 2, where flap 6 on both sides are in the upward position right under wing 4, to move flap 6 downward pivotally away from wing 4 to allow the flow of wind to lift the back of boat 1 above the water surface, pressing switch 107 causes both motors 84 on the right and the left side to work simultaneously thus pulleys 81 and 82 rotates clockwise, and cable 85 pulls flap 6 pivotally downward and at the same time cable 90 is released from pulley 82 while flap 6 moves pivotally downward.

Oppositely, when switch 108 is pressed, motor 84 starts functioning and turns pulleys 81 and 82 counterclockwise while cable 90 pulls flap 6 to move pivotally upward.

Likewise, if either of flap 5 or 6 on each side is to move upward or downward separately, this can be done by pressing any of the corresponding switch.

The reason that any of the switches can be pressed to separately control moving either of the flaps on the right or the left side is to make it possible to tilt the boat right or left after the whole boat is lifted up above the water surface and the boat is in balance, yet the propeller is still under the water and rotates to drive the boat forward. This is in the same manner as that of airplane which can tilt right or left while flying in the air by controlling the ailerons. This will add much more fun to drive this newly invented boat as sport-boat.

Driving a Flying Outboard Boat

To lift boat 1 up in the air allowing only propeller 20 to be under the water, before starting engine 2 of boat 1, press switch 103 that motor 31 lifts engine 2 where an automatic switch in motor 31 turns off the motor when engine 2 is in the uppermost position. Yet propeller 20 is just under the water shown in FIG. 2.

Press switches 106 and 108 to keep all the flaps in the uppermost position under wing 4.

Figure 3:
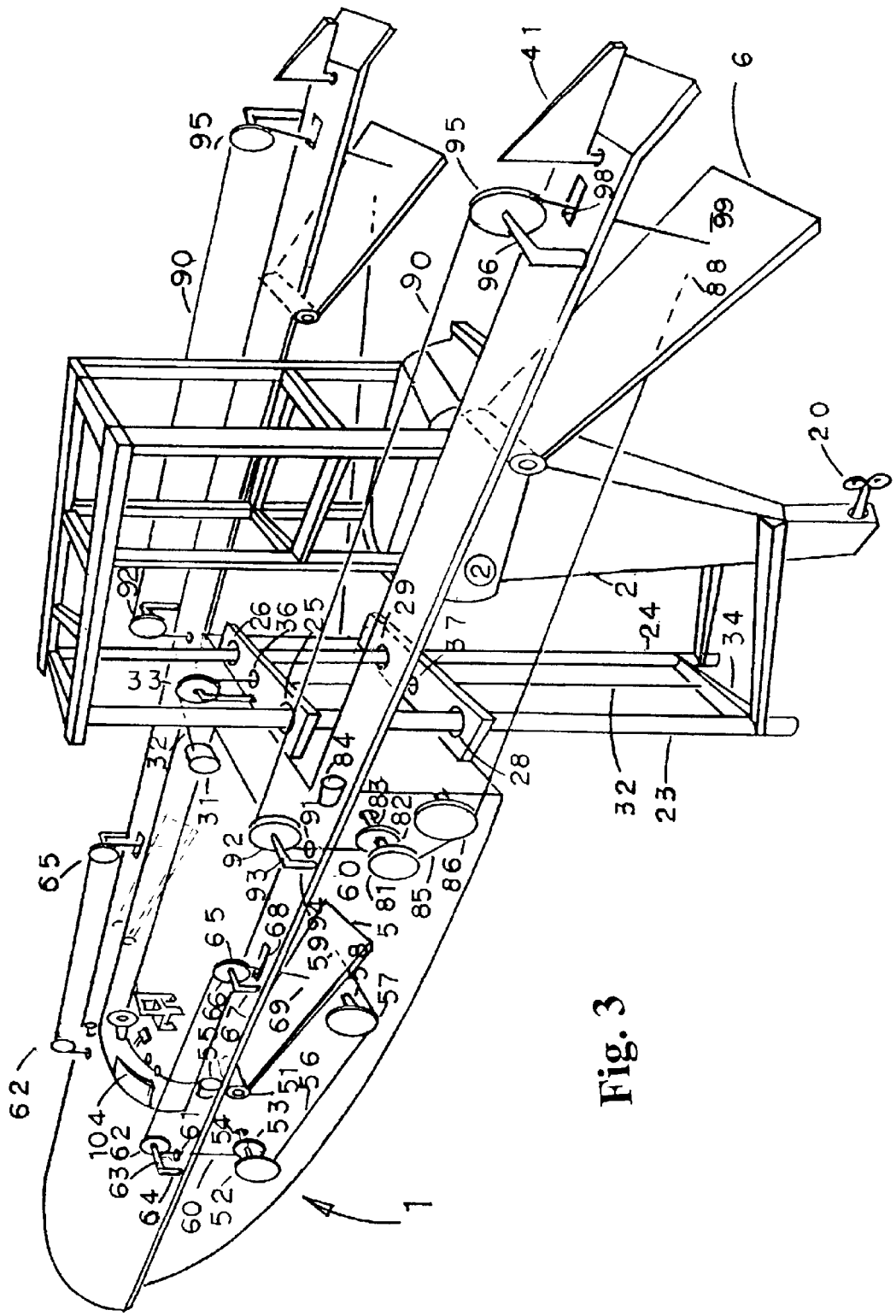
FIG. 3 is a perspective view of an outboard boat while flying above the water.
Figure 4:
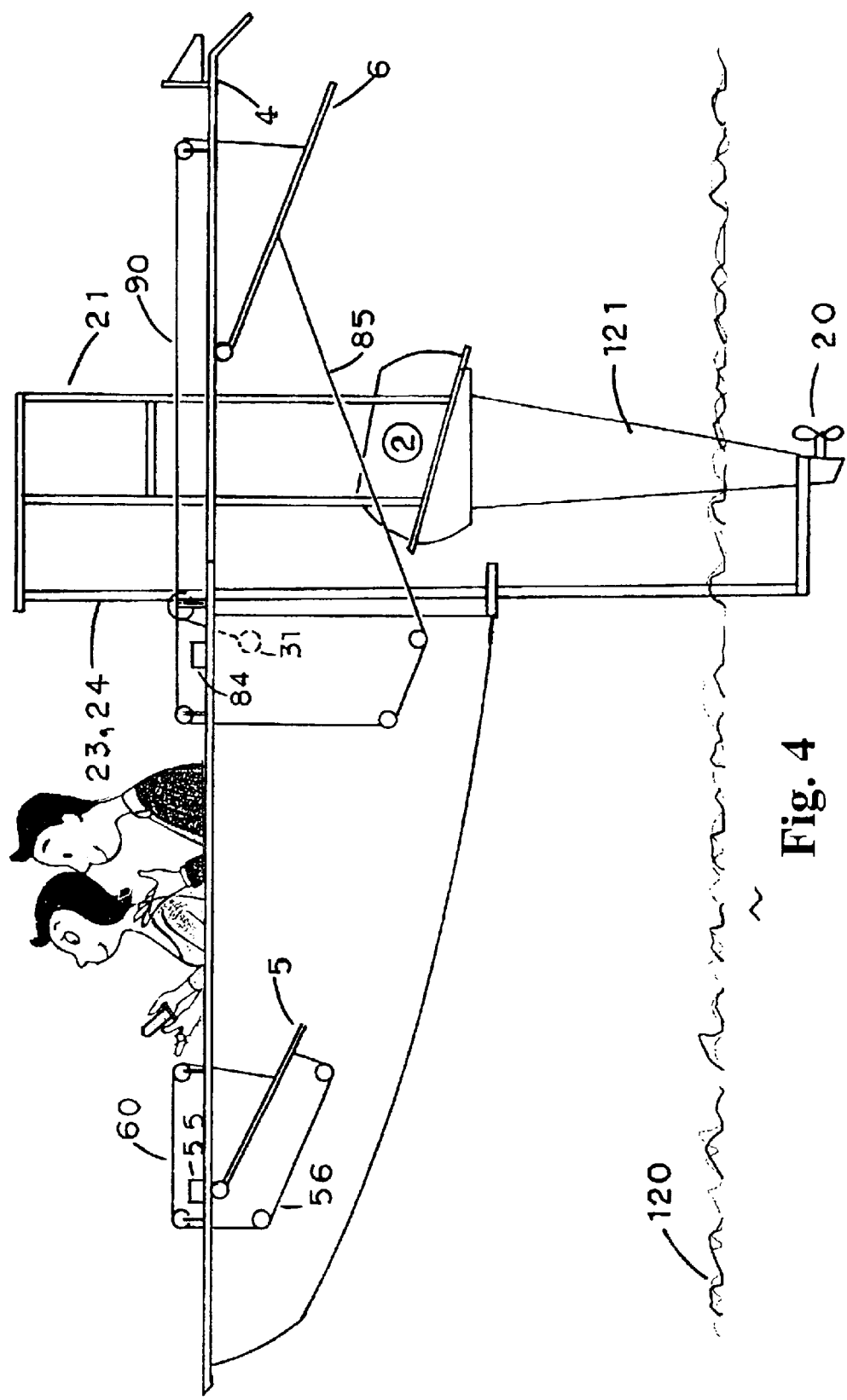
FIG. 4 is a side view of the outboard boat as in FIG. 3.

Start the engine and press the accelerating pedal 101 with right foot to speed up the boat to reach a velocity that wind lifts the front part of the boat up high while the back part is still at the water surface as in FIG. 2. At this position, press pedal 101 to reach the highest speed driven by propeller 20 and simultaneously press switch 102 with left foot to let motor 31 lowers the level of engine 2 gradually and press switch 107 with left hand to allow both flaps 6 to move pivotally downward simultaneously. Right hand controls the steering wheel 100 to drive the boat straightly forward. The lowermost of the rear part of boat 1 at the water surface is then gradually lifted up to allow most parts of boat 1 to move just above the water. Adjust the pivoting of flaps 5 and 6 to any angle is possible through switches 105–108 where propeller 20 is to be kept under the water at all time as shown in FIGS. 3 and 4. Through adjusting the flaps and the speed of the boat, uplift of the boat can be as high as desired, only that the propeller needs to be in the water at all time. But if boat 1 is lifted too high that propeller 20 is lifted over the water surface, then boat will fall down to bump against the water surface.

When boat is to be back to the water again, gradually decelerate the engine and press switches 106 and 108 to keep all the flaps in the uppermost position and simultaneously move engine 2 vertically upward to keep propeller back to its position at the back of boat 1 as in FIGS. 1 and 2.

Presently, to move engine 2 downward that the whole boat is lifted above the water surface, it is necessary to keep engine 2 at a level always above the water where stem 121 can be under the water. The engine available at present having 40 horsepower generally has a stem of about 1 meter long. Thus, it is possible to lift the boat only about one meter high above the water surface which is enough to reduce friction and makes the boat move very smoothly.

Theoretically, boat 1 can be lifted to any level above the water surface depends on the length of iron shafts 23 and 24. However, if these two iron shafts are too long and if engine is move down to a very low level beneath the boat bottom, a boat driver with not enough experience in controlling the boat or if the engine or the navigation control system is out of order, boat 1 will fall rapidly to the water surface. The engine will sink and can be damaged. The length of stem 121 then should increase to an extent as desired.

To move all the flaps pivotally and the engine vertically upward or downward may be possible by the system described herein or either mechanically or using hydraulic system or any of the system that allows all the components to function as presently described. To hold flaps or engine at the uppermost or lowermost position is by the use of any type of automatic switches to turn off motor 31, 55 or 84 automatically to prevent overheat and damage to the motors.

It will be understood that modifications can be made in the above description without departing from the scope of this invention by one of ordinary skill in the art. It is accordingly intended that all matter contained in the above description be interpreted as descriptive and illustrative rather than in a limiting sense.

It is also to be understood that the following claims are intended to cover all of the generic and specific features of the invention as described herein, and all statements of the scope of the invention which, as a matter of language, might be said to fall therebetween.

We claim:

1. A flying outboard motor boat which can fly above the water surface having only propeller means under the water to drive said boat forward at high speed continuously, wherein the outboard motor can be moved up and down vertically to keep said propeller means at its lowest end under the water surface at all times; and further wherein the hull of the boat has wings projecting out sidewards and extending rearwardly of the boat and wherein there is installed an air rudder on top of each wing and with the wings posterior ends bending slightly downwards; further comprising flaps mounted underneath said wings for lifting said boat aerodynamically over the water; two of said flaps being provided at the anterior portion and two of said flaps being provided at the posterior portion of the wings, and wherein each flap can be pivotally moved upwards and downwards about hinges fixed under the wings; the movement of the outboard motor and the flaps being controlled by power means.

* * * * *